Figure 1:
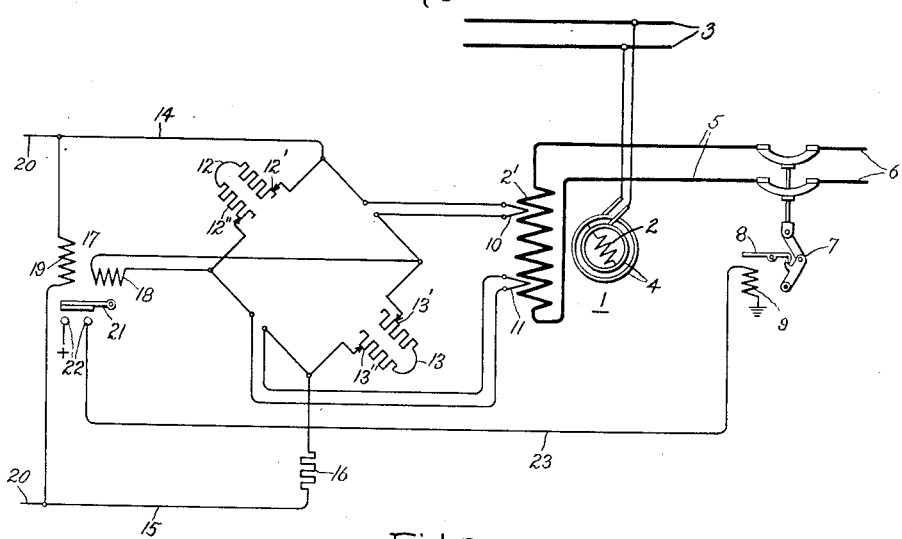

Feb. 7, 1933.  O. C. TRAVER  1,896,856

TEMPERATURE RELAY

Filed May 1, 1930

Inventor:
Oliver C. Traver,
by Charles E. Mullan
His Attorney.

Patented Feb. 7, 1933

1,896,856

UNITED STATES PATENT OFFICE

OLIVER C. TRAVER, OF PENFIELD, UPPER DARBY, PENNSYLVANIA, ASSIGNOR TO GENERAL ELECTRIC COMPANY, A CORPORATION OF NEW YORK

TEMPERATURE RELAY

Application filed May 1, 1930. Serial No. 449,063.

My invention relates to electrical protective systems for use with electrical translating devices and particularly to means for protecting such devices in accordance with the temperature thereof and the temperature of the ambient medium which comes in contact with the heated parts of the machine, and varying this protection in accordance with the temperature of the ambient medium.

An electrical machine is designed for that load which will give a certain definite temperature rise within the winding, when the machine is operated in a specified ambient temperature. This standard of temperature rise is usually 55° C. when the machine is operated in an ambient medium of 40° C. and is determined by the permissible heating of the insulation of the windings. When such a machine is operated in an ambient medium of a lower temperature, for instance zero degrees centigrade, a much higher rise is permissible within the windings of the machine if the machine is to be operated at its maximum capacity. To operate the machine at such an overload as would bring the temperature of the windings up to the same absolute temperature as would be permissible were the machine operating in a 40° ambient medium, would entail a temperature rise of 95°. Such a large change in temperature of the windings of an electrical machine sets up excessive mechanical stresses and causes electrical instability and other conditions not contemplated in the design of the machine. Accordingly, it will be seen that there are factors other than the heating of the insulation which enter into the determination of the safe allowable maximum temperature rise within a machine operating in an ambient medium lower than normal. These factors are first, mechanical stresses due to excessive temperature change; second, electrical instability due to changing resistance; and third, the time lag of the temperature measuring means which becomes important on severe overloads when the heating of the coils is extremely rapid.

In accordance with the above it is an object of my invention to provide an electrical protective system which shall be adapted to be operated in accordance with the difference between the temperature of the windings in an electrical machine and the temperature of the ambient medium, only when the temperature rise within the machine exceeds a safe allowable maximum for any particular ambient temperature.

Another object of my invention is to allow the operation of an electrical machine at the highest possible load consistent with the limiting factors mentioned above when the machine is operating in an ambient medium of a temperature lower than normal.

Other objects will appear as the description of the invention proceeds.

Throughout the description of my invention the term "ambient temperature" shall be taken to mean the temperature of the fluid or liquid or other material which comes in contact with the heated parts of the machine and carries off its heat.

In my present device I make use of the well known Wheatstone bridge connection to compare the resistance of elements imbedded in the windings of a machine with the resistance of resistors subject to the ambient temperature. For the elements imbedded within the machine I use copper or some similar material having a relatively high temperature coefficient of resistance. Preferably the resistors subjected to the ambient temperature are made up of two parts, connected in series or parallel, one of these parts being composed of a material having a relatively high temperature coefficient of resistance similar to that of the elements imbedded in the windings of the machine and the other of these parts being composed of a material having a substantially zero coefficient of resistance such as manganin. It will thus be seen that the resulting temperature coefficient of these two part resistors is determined by the proportion of material used in each part. It will be understood that I may make my two part resistors adjustable and vary the resulting temperature coefficient by adjusting the ratio between the effective lengths of the two parts or I may use a resistor composed of a single material having the desired temperature coefficient. When a source of current is applied to the Wheatstone bridge the voltage drops across the two resistance elements imbedded within the machine will exceed the voltage drops across the two resistors subjected to the ambient temperature by an amount proportional to the temperature rise. This proportionality for any degree ambient temperature may be predetermined by properly selecting the resistance and temperature coefficient of the resistors subjected to the ambient temperature. By using adjustable resistors I may either vary the total resistance and maintain a constant resultant temperature coefficient or I may maintain a constant resistance and vary the resulting temperature coefficient. The electrical unbalance of the bridge is utilized to cause a current to flow in the coil of a relay which may control the circuit breaker of the machine or may be used to give an alarm.

My invention will be better understood from the following description taken in connection with the accompanying drawing and its scope will be pointed out in the appended claims.

Referring to the accompanying drawing, Fig. 1 represents a diagrammatic view of an electrical circuit in which is connected an electrical translating device which is adapted to be protected by a system embodying my invention.

Figure 2:
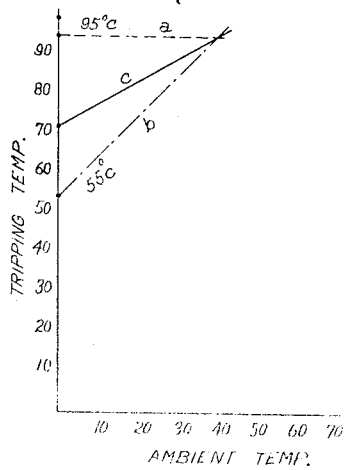

Fig. 2 is a chart showing how the tripping temperature varies with respect to the ambient temperature.

Referring to Fig. 1 of the drawing a dynamo electric machine 1 has a rotating field winding 2 connected to the electrical circuit 3 through slip rings 4. The stator winding 2' of this machine is connected to the transmission lines 6 by means of conductors 5 and circuit breaker 7. It will be observed that circuit breaker 7 is of the latched-in type which is held in closed position by means of the latch member 8 actuated by trip coil 9. Imbedded in the coils of the stator winding 2' of the machine are temperature resistance elements 10 and 11 which in the present embodiment of my invention are composed of copper. It will be understood that by the use of slip rings the resistance elements may be embedded in the rotating field winding if desired. Each of these resistance elements is connected in diametrically opposite arms of a Wheatstone bridge circuit which also includes in the other arms resistors 12 and 13 having a resultant temperature coefficient of resistance intermediate zero and that of the resistance elements. Resistor 12 is composed of two parts 12' and 12" connected in series and connected in the bridge circuit by sliding contacts. Likewise resistor 13 is made up of two parts 13' and 13" and is connected in the diametrically opposite arm of the bridge circuit by sliding contacts. The Wheatstone bridge is supplied with current of a substantially constant potential by supply lines 20. The path of this current extends through conductor 14 to one side of the Wheatstone bridge, through the various parts of the bridge circuit and thence through current limiting resistor 16 and conductor 15 back to the other side of the supply line 20. An induction relay shown diagrammatically at 17 has its potential coil 19 connected directly across the supply line 20 and its current coil 18 connected across normally equi-potential points of the Wheatstone bridge. Cooperating with the actuating coils of induction relay 17 is an armature 21 which is adapted to close contacts 22 upon the occurrence of a sufficient energizing current in the coil 18. The closing of contacts 22 completes a circuit for the trip coil 9 of circuit breaker 7 which extends from the positive side of the circuit through the contacts 22, conductor 23 and trip coil 9 to ground.

Let us assume that the machine to be protected has been given a rating corresponding to a temperature rise of 55° C. in a 40° C. ambient.

At an ambient temperature of 40° C. and a machine temperature of 95° C. the resistance of resistance elements 10 and 11 must exceed the resistance of resistors 12 and 13 by an amount sufficient to unbalance the bridge and cause a current to flow in coil 18 of the proper magnitude and direction to trip the relay 17. Let us designate this amount $n$ ohms. If the ambient temperature be 0° C. the resistance of resistors 12 and 13 will change in accordance with their temperature resistance characteristic. It is then found that the temperature at which the resistance of elements 10 and 11 exceeds the resistance of resistors 12 and 13 by $n$ ohms is approximately 70° C. The reason for this is that the resistance of resistance elements 10 and 11 varies in accordance with a temperature-resistance characteristic different from that of resistors 12 and 13. This allows the machine to operate at a temperature rise greater than 55° C., when operated in a low ambient temperature. The magnitude of this temperature rise in a 0° C. ambient may be limited to a safe allowable maximum for that temperature by selecting the proper temperature coefficient for resistors 12 and 13. The temperature rise at any ambient temperature between 0° C. and 40° C. will then vary inversely as the change in ambient temperature.

Referring to Fig. 2 of the drawing curve $a$ represents the temperature of the windings at which the relay 17 will operate when the resistors 12 and 13 have a resultant temperature coefficient of zero. Curve $b$ represents the temperature of the windings at which the relay 17 will operate when the resistors 12 and 13 have a resultant temperature coefficient the same as the temperature coefficient of the resistance elements embedded within the machine. Curve c represents the temperature of the windings at which the relay 17 will operate when the temperature coefficient of resistors 12 and 13 has a value intermediate between zero and that of the resistance elements, 10 and 11. The position of curve c between curves a and b may be determined by properly selecting the temperature coefficient of the resistors 12 and 13 or by properly adjusting their several parts as explained above.

The embodiment of my invention illustrated and described herein has been selected for the purpose of clearly setting forth the principles involved. It will be understood that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. In an electrical system including an electrical translating device, means for controlling said device in response to the variation of the temperature of the device from the ambient temperature, comprising a plurality of resistance elements responsive to the temperature of the device, a plurality of resistors responsive to the ambient temperature and control means energized in accordance with the variations of the resistance of said resistance elements and said resistors.

2. In an electrical system including an electrical translating device, means for controlling said device in response to the variations of the temperature of the device from the ambient temperature, comprising a resistance element responsive to the temperature of the device, a resistor responsive to the ambient temperature and control means energized in accordance with the variations of the resistance of said resistance element and said resistor.

3. In an electrical system including a dynamo electric machine, a protective system therefor including means for controlling said machine in accordance with the variation of the temperature of the machine from the ambient temperature, comprising resistance elements responsive to the temperature of said machine having a relatively high positive temperature coefficient of resistance, and resistors responsive to the ambient temperature having a temperature coefficient of resistance less than that of said resistance elements but substantially greater than zero, and a safety device energized in accordance with the variations of the resistance of said resistance elements and said resistors.

4. In an electrical system including a dynamo electric machine, a protective system therefor, including a Wheatstone bridge circuit comprising a plurality of resistance elements having a relatively high positive temperature coefficient of resistance and responsive to the temperature of said machine, a plurality of resistors having a temperature coefficient of resistance less than that of said resistance elements but substantially greater than zero and responsive to the ambient temperature and a safety device energized in accordance with the variations of the resistance of said resistance elements and said resistors.

5. In an electrical system including a dynamo electric machine, a protective system including a Wheatstone bridge circuit comprising a plurality of resistance elements having a relatively high positive temperature coefficient of resistance and responsive to the temperature of said machine, a plurality of resistors responsive to the ambient temperature, each of said resistors comprising a section having a relatively high temperature coefficient of resistance and a section having a substantially zero temperature coefficient of resistance, and a safety device energized in accordance with variations of the resistance of said resistance elements and said resistors.

6. In an electrical system including a dynamo electric machine, a protective system therefor comprising an electrical network, a source of current therefor, said network including a plurality of resistance elements subject to the temperature of said machine, a plurality of resistors subject to ambient temperature and a safety device actuated in accordance with the division of current within the network.

7. In an electrical system, a dynamo electric machine, a protective system therefor, means for controlling said machine in accordance with variations in the ambient temperature comprising resistance elements having a relatively high positive temperature coefficient of resistance responsive to the temperature of said machine, resistors having a temperature coefficient of resistance adjustable between zero and that of said resistance elements and responsive to the ambient temperature, and control means actuated in accordance with the variation in resistance of said resistance elements and said resistors.

8. A resistor comprising two elements, one of which is composed of a material having a relatively high positive temperature coefficient of resistance and the other of which is composed of a material having a substantially zero temperature coefficient of resistance.

9. In an electric device connected to an electrical system, protective means therefor, including means for disconnecting said device from said system, a Wheatstone bridge including resistance elements having a relatively high positive temperature coefficient of resistance associated with said device, resistors having a temperature coefficient less than that of the resistance elements but substantially greater than zero and responsive to ambient temperature, a source of energy connected across one diameter of said bridge, a relay having a substantially constantly energized winding and a second winding connected across the other diameter of said bridge and responsive to the unbalance of currents therein, and contacts associated with said relay for energizing said disconnecting means when the temperature of said machine reaches a predetermined limit dependent upon the ambient temperature.

10. An electrical protective system for an energy translating device including means for controlling said device, means for creating an electrical effect which varies at a predetermined rate with respect to the ambient temperature, means for creating an electrical effect which varies at a greater rate with respect to the temperature of said device and means for actuating said controlling means in response to the difference between said electrical effects.

11. An electrical protective system for an energy translating device including means for controlling said device, an element whose resistance varies at a predetermined rate with respect to the ambient temperature, an element whose resistance varies at a greater rate with respect to the temperature of said device and means for actuating said controlling means in response to the difference between the values of said resistances.

12. An electrical protective system for an energy translating device including means for controlling said device, an element whose impedance varies at a predetermined rate with respect to the ambient temperature, an element whose impedance varies at a greater rate with respect to the temperature of said device and means for actuating said controlling means in response to the difference between the values of said impedances.

13. The method of controlling an electrical device in response to variations of its temperature from the ambient temperature which comprises producing an electrical effect which bears a predetermined ratio to variations in the ambient temperature, producing an electrical effect which bears a greater ratio to variations in the temperature of the device and controlling said device in response to the difference between said electrical effects.

In witness whereof, I have hereto set my hand this 29th day of April, 1930.

OLIVER C. TRAVER.